United States Patent
Yoshioka

(10) Patent No.: US 9,982,734 B2
(45) Date of Patent: May 29, 2018

(54) COMPOSITE COIL SPRING

(71) Applicant: MITSUBISHI STEEL MFG. CO., LTD., Chuo-Ku, Tokyo (JP)

(72) Inventor: Jun Yoshioka, Canton, MI (US)

(73) Assignee: MITSUBISHI STEEL MFG. CO., LTD. (JP)

( * ) Notice: Subject to any disclaimer, the term of this patent is extended or adjusted under 35 U.S.C. 154(b) by 0 days. days.

(21) Appl. No.: 15/584,414

(22) Filed: May 2, 2017

(65) Prior Publication Data
US 2017/0234392 A1 Aug. 17, 2017

Related U.S. Application Data

(63) Continuation of application No. 14/415,266, filed as application No. PCT/US2012/051318 on Aug. 17, (Continued)

(51) Int. Cl.
*F16F 1/366* (2006.01)
*B29C 70/08* (2006.01)
(Continued)

(52) U.S. Cl.
CPC .......... *F16F 1/3665* (2013.01); *B29C 70/085* (2013.01); *B29K 2277/00* (2013.01);
(Continued)

(58) Field of Classification Search
CPC .................. B29C 70/085; B29C 70/30; B29L 2031/7742; F16F 1/3665; F16F 1/366;
(Continued)

(56) References Cited

U.S. PATENT DOCUMENTS 2,852,424 A * 9/1958 Reinhart ............... B29B 15/125
156/154
5,549,370 A 8/1996 Folsom
5,603,490 A 2/1997 Folsom

FOREIGN PATENT DOCUMENTS

EP 0637700 2/1995
GB 2056615 3/1981
(Continued)

OTHER PUBLICATIONS

International Search Report for PCT Application No. PCT/US2012/051318 completed Mar. 21, 2013.

*Primary Examiner* — Melanie Torres Williams
(74) *Attorney, Agent, or Firm* — Carlson, Gaskey & Olds, P.C.

(57) ABSTRACT

A composite coil spring includes a coil body that has a core and fiber layers impregnated with a polymer material. The fiber layers are wound around the core. The fiber layers extend around the coiled axis at oblique fiber angles. Each of the fiber layers includes a number of fibers that is a product of a common base number of fibers multiplied by a positive non-zero integer from a set of positive non-zero integers from 1 to 20. The positive non-zero integer of at least one of the fiber layers is different from the positive non-zero integer of at least one other of the fiber layers. At least one of the fibers layers is glass fibers and another of the fiber layers is carbon fibers, and each of an innermost fiber layer and an outmost fiber layer of the fiber layers is independently selected from glass fibers and carbon fibers.

19 Claims, 2 Drawing Sheets

Related U.S. Application Data

2012, now Pat. No. 9,677,637, which is a continuation of application No. 13/551,977, filed on Jul. 18, 2012, now Pat. No. 8,857,801.

(51) Int. Cl.

| | |
|---|---|
| *B29K 277/00* | (2006.01) |
| *B29K 307/04* | (2006.01) |
| *B29K 309/08* | (2006.01) |
| *B29L 31/00* | (2006.01) |
| *B60G 11/14* | (2006.01) |

(52) U.S. Cl.
CPC ...... *B29K 2307/04* (2013.01); *B29K 2309/08* (2013.01); *B29L 2031/7742* (2013.01); *B60G 11/14* (2013.01)

(58) Field of Classification Search
CPC .......... F16F 1/04; F16F 1/06; B29K 2277/00; B29K 2307/04; B29K 2309/08
See application file for complete search history.

(56) References Cited

FOREIGN PATENT DOCUMENTS

| | | |
|---|---|---|
| JP | 52034161 | 3/1977 |
| JP | 52036250 | 3/1977 |
| JP | 63295239 | 12/1988 |
| JP | 1269736 | 6/1991 |
| JP | 4136530 | 5/1992 |
| JP | 07042778 | 2/1995 |
| JP | 10009315 | 1/1998 |
| JP | 2006226327 | 8/2006 |
| JP | 2007064389 | 3/2007 |
| WO | 9614519 | 5/1996 |

\* cited by examiner

COMPOSITE COIL SPRING

CROSS REFERENCE TO RELATED APPLICATIONS

The present disclosure is a continuation of U.S. application Ser. No. 14/415,266, filed Jan. 16, 2015, which is a National Stage filing of International Application No. PCT/US12/51318, filed Aug. 17, 2012, which claims priority to U.S. patent application Ser. No. 13/551,977, filed Jul. 18, 2012, now issued as U.S. Pat. No. 8,857,801.

BACKGROUND

This disclosure relates to composite coil springs that may be used in vehicle suspension systems.

Coil springs are known and used in a variety of different applications, such as vehicle suspension systems. A typical coil spring is fabricated of a steel material in order to provide the desired mechanical properties and durability that is required for such applications. As an alternative, composite coil springs are desired as a replacement for steel coil springs due to weight savings. However, although composite coil springs may be known and used in some applications, it is often difficult to design such composite coil springs with the desired mechanical properties for a given application, and then to fabricate the composite coil spring economically.

SUMMARY

A composite coil spring according to an example of the present disclosure includes a coil body that has a core and a plurality of fiber layers impregnated with a polymer material. The fiber layers are wound around the core at different radial distances from the coiled axis. Each of the fiber layers extends around the coiled axis at an oblique fiber angle to the coiled axis. Each of the fiber layers has a number of fibers that is a product of a common base number of fibers multiplied by a positive non-zero integer from a set of positive non-zero integers from 1 to 20. The positive non-zero integer of at least one of the fiber layers is different from the positive non-zero integer of at least one other of the fiber layers. At least one of the fibers layers is glass fibers and another of the fiber layers is carbon fibers. Each of an innermost fiber layer and an outmost fiber layer of the fiber layers is independently selected from glass fibers and carbon fibers.

In a further embodiment of any of the foregoing embodiments, the oblique angle is +/-20-54°.

In a further embodiment of any of the foregoing embodiments, the innermost fiber layer and the outermost fiber layer have equal positive non-zero integers.

In a further embodiment of any of the foregoing embodiments, the innermost fiber layer and the outermost fiber layer have non-equal positive non-zero integers.

In a further embodiment of any of the foregoing embodiments, the core is a fibrous core.

In a further embodiment of any of the foregoing embodiments, the positive non-zero integer of the one of the fiber layers that is different from the positive non-zero integer of the other of the fiber layers is different by more than 2.

In a further embodiment of any of the foregoing embodiments, the fiber layer that has the positive non-zero integer that is different from the positive non-zero integer of the other of the fiber layers by more than 2 is glass fibers, and the other of the fiber layers is carbon fibers.

In a further embodiment of any of the foregoing embodiments, the oblique fiber angle of each of the plurality of fiber layers is also oblique to at least one directly neighboring one of the plurality of fiber layers.

In a further embodiment of any of the foregoing embodiments, each of the fiber layers contains from 4 to 60 fiber rovings.

In a further embodiment of any of the foregoing embodiments, rein each of the fiber rovings has either 2000 fibers or 4000 fibers.

In a further embodiment of any of the foregoing embodiments, the innermost fiber layer and the outermost fiber layer have non-equal positive non-zero integers.

In a further embodiment of any of the foregoing embodiments, the polymer material includes at least one of epoxy or polyester.

In a further embodiment of any of the foregoing embodiments, at least one of the fiber layers is aramid fibers.

In a further embodiment of any of the foregoing embodiments, at least one of the fiber layers is metallic fibers or ceramic fibers.

In a further embodiment of any of the foregoing embodiments, the core is a solid core.

A composite coil spring according to an example of the present disclosure includes a coil body that has a core and a plurality of fiber layers impregnated with a polymer material. The fiber layers are wound around the core at different radial distances from the coiled axis. Each of the fiber layers extends around the coiled axis at an oblique fiber angle to the coiled axis. Each of the fiber layers includes a number of fibers that is a product of a common base number of fibers multiplied by a positive non-zero integer from a set of positive non-zero integers from 1 to 20. The positive non-zero integer of at least one of the fiber layers is different from the positive non-zero integer of at least one other of the fiber layers. At least one of the fibers layers is glass fibers and another of the fiber layers is carbon fibers. Each of an innermost fiber layer and an outmost fiber layer of the fiber layers contains from 4 to 60 fiber rovings.

In a further embodiment of any of the foregoing embodiments, the oblique fiber angle is +/-20-54°.

In a further embodiment of any of the foregoing embodiments, the fiber layer that has the positive non-zero integer that is different from the positive non-zero integer of the other of the fiber layers by more than 2 is glass fibers, and the other of the fiber layers is carbon fibers.

In a further embodiment of any of the foregoing embodiments, each of the fiber rovings has either 2000 fibers or 4000 fibers.

In a further embodiment of any of the foregoing embodiments, the innermost fiber layer and the outermost fiber layer have non-equal positive non-zero integers.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
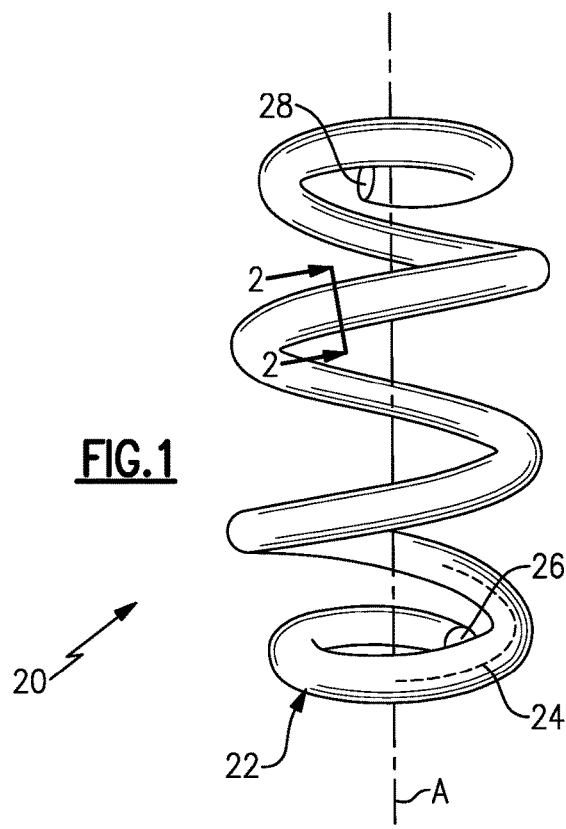
FIG. 1 shows a composite coil spring.

FIG. 1 shows an example composite coil spring 20 that may be used in a suspension system of a vehicle, for example. It is to be understood, however, that the composite coil spring 20 is not limited to such uses. The composite coil spring 20 may be helical or alternatively have a different coil shape. In this disclosure, a "coil" or variations thereof means a body that curves continuously around a fixed linear axis, such as axis A in FIG. 1. As will be appreciated, the composite coil spring 20 is strong and lightweight and therefore provides a weight reduction for the replacement of metallic coil springs in vehicles or other applications, which can improve fuel mileage.

The composite coil spring 20 includes a coil body 22 that extends along a coiled axis 24 between terminal ends 26/28. Referring also to a cross-section of the coil body 22 shown in FIG. 2 and a portion of the composite coil spring 20 shown in FIG. 3, the coil body 22 includes a polymer material 30 and a plurality of fiber layers 32 impregnated with the polymer material 30. For example, the polymer material 30 can be epoxy or polyester. Alternatively, the polymer material can be a different composition of organic polymer than epoxy or polyester. A "layer" has a uniform radial thickness around the entire layer circumference.

Each of the fiber layers 32 includes a plurality of fibers 34 that are arranged at an oblique fiber angle α (alpha) to the coiled axis 24. For example, the fibers 34 are or include metallic fibers, ceramic fibers, organic fibers or combinations thereof. In further examples, the fibers 34 are glass fibers, carbon fibers, aramid fibers or combinations thereof. For purposes of description, the fibers 34 of the fiber layers 32 are not shown in FIG. 2.

Figure 4:
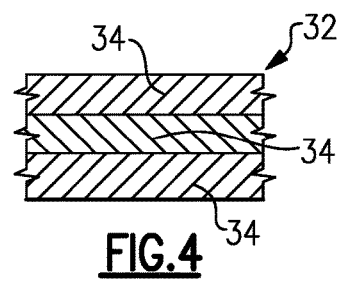
FIG. 4 shows alternating fiber orientations of fiber layers of the composite coil spring of FIG. 1.

The fibers 34 of each of the fiber layers 32 extend around the coiled axis 24 at the selected oblique fiber angle α. In one example, the oblique fiber angle α is +/−20-54° to provide the coil body 22 with a high degree of strength. The fiber layers 32 may alternate in fiber orientation such that the oblique fiber angle α of any one of the fiber layers 32 is also oblique to one or two directly neighboring ones of the fiber layers 32 (FIG. 4) at each location along the coiled axis 24.

The fiber layers 32 are arranged at different radial distances, as shown at 36, from the coiled axis 24. In this disclosure, the radial distances 36 are the distances between the coiled axis 24 and the radially inner surface of the fiber layers 32.

Figure 2:
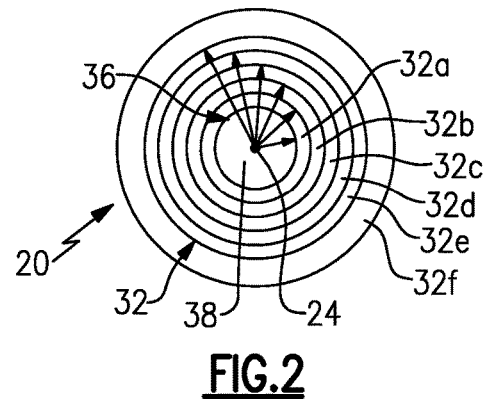
FIG. 2 shows a cross-section of the coil spring taken perpendicularly to a coiled axis of the coil spring of FIG. 1.
Figure 3:
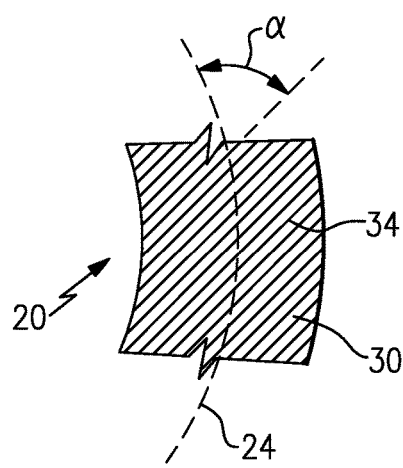
FIG. 3 shows a portion of a fiber layer of the composite coil spring of FIG. 1.

As shown in FIG. 2, the plurality of fiber layers 32 includes fiber layers 32a-f. Fiber layer 32a is an innermost layer with regard to radial distance from the coiled axis 24 and fiber layer 32f is an outermost layer with regard to radial distance from the coiled axis 24. As used in this disclosure, the terms "innermost" and "outermost" mean that there are no other fiber layers located radially inwards or radially outwards of, respectively, of the innermost fiber layer 32a and the outermost fiber layer 32f.

Figure 6:
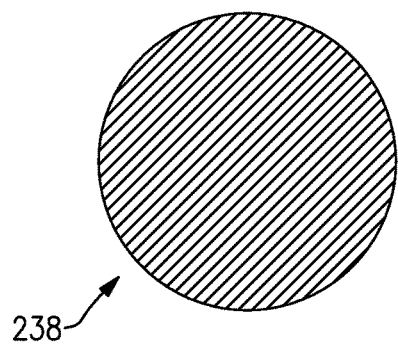
FIG. 6 shows an example solid core for a composite spring coil.
Figure 7:
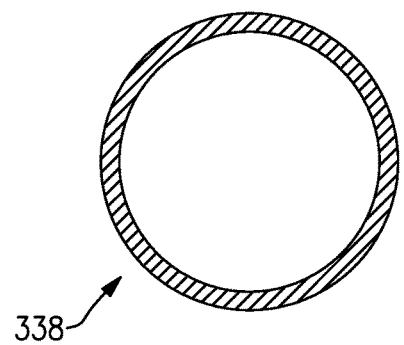
FIG. 7 shows an example hollow tube core for a composite spring coil.
Figure 8:
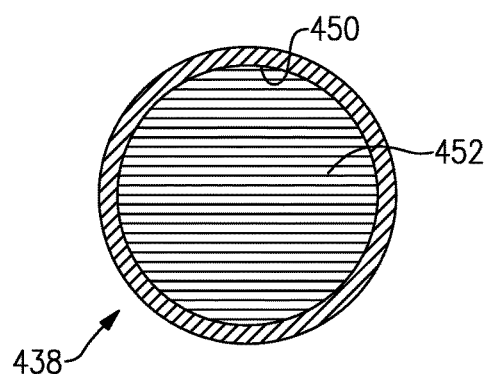
FIG. 8 shows an example filled tube core for a composite spring coil.
Figure 5:
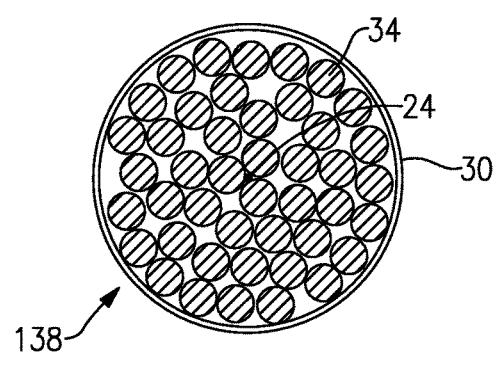
FIG. 5 shows an example fibrous core for a composite spring coil.

In this example, the fiber layers 32 are wound around a core 38. The core 38 can be a fibrous core 138 impregnated with the polymer 30 (FIG. 5). The fibers 34 of the fibrous core 138 can extend substantially parallel to the coiled axis 24, within +/−20°. In another alternative, the core 38 can be a solid, non-fibrous core 238 (FIG. 6) that is polymeric or metallic. In other alternatives, the core 38 can be a hollow tube 338 (FIG. 7) or a tube 438 (FIG. 8) that has an interior cavity 450 that includes a filler material 452. The filler material 452 can be different in composition from the material of the tube 448, such as two different polymer compositions, metallic compositions or combinations. The material and diameter of the core 38 can be selected such that the core 38 is flexible to allow formation of the desired coil shape. In any of the above examples, the core 38 can be or can include a shape memory material that changes shape in response to changes in temperature relative to a temperature threshold, to aid in formation of the coil shape.

Each of the fiber layers 32 and, optionally, the fibrous core 138 includes a number of the fibers 34 that is a product of a common base number of fibers multiplied by a positive non-zero integer selected from a set of positive non-zero integers. The common base number is a predetermined number that is equal for each of the fiber layers 32 and the fibrous core 138. The positive non-zero integer of at least one of the fiber layers 32 is different from the positive non-zero integer of the fibrous core 38 and can also be different from at least one other of the fiber layers 32. Using the number of fibers 34 that is a product of the common base number of fibers multiplied by a positive non-zero integer selected from the set of positive non-zero integers facilitates manufacturing and also provides a desirable strength profile.

In a further example, the fibrous core 138 and the outermost fiber layer 32f (multiple second fiber layers) have equal positive non-zero integers. The fiber layers 32a-e are intermediate layers (multiple first fiber layers) that are arranged radially between the fibrous core 138 and the outermost fiber layer 32f. In this example, the intermediate fiber layers 32a-e have equal positive non-zero integers and these integers are non-equal to the integers of the fibrous core 138 and the outermost fiber layer 32f. That is, at least two of the fiber layers 32 have different positive non-zero integers and at least one of the fiber layers 32 has a different positive non-zero integer than the fibrous core 138. In this example, the positive non-zero integer of the intermediate fiber layers 32a-e is less than the positive non-zero integer of the fibrous core 138 and the outermost fiber layer 32f, which can be equal.

In a further example, the intermediate fiber layers 32a-e each have a number of fibers N1 and the fibrous core and the outermost fiber layer 32f each have a number of fibers N2 that is different from the number of fibers N1 by a multiplier factor. In a further example, the positive multiplier factor is 2-20.

As a further example, the number of fibers 34 in any one of the fiber layers 32 and the fibrous core 138 corresponds to the number of fibers 34 in one or more fiber rovings that are used to fabricate the fiber layers 32 and fibrous core 138 of the coil body 22. For example, a single fiber roving may have 2,000 individual fibers and 11 rovings that establish the common base number of fibers, which in this example would be 22,000 fibers. Thus, the actual number of fibers 34 in any one of the fiber layers 32 and fibrous core 138 would be 22,000 fibers multiplied by the selected positive non-zero integer for that individual fiber layer 32. For example, the set of positive non-zero integers is between 1 and 20. It is to be understood, however, that the number of fibers 34 per roving and the number of rovings used to determine the common base number of fibers can be varied. In a further example, between 4 and 60 rovings may be used, with either 2,000 or 4,000 fibers per roving.

It is to be further understood that the number of fibers 34 in any one of the fiber layers 32 or the fibrous core 138 may practically vary somewhat because a small number of fibers 34 may break during fabrication and/or rovings may vary from a nominal fiber count. Thus, in examples where the numbers of fibers 34 in fiber layers 32 are equal, or the numbers of fibers 34 in any of the fiber layers 32 and in the fibrous core 138 are equal, the equivalence can be based upon the nominal numbers of fibers. Similarly, where the numbers of fibers 34 in fiber layers 32 are different, or the numbers of fibers 34 in any of the fiber layers 32 and in the fibrous core 138 are different, the difference can be based upon the nominal numbers of fibers.

In the above example where there are 2,000 fibers per roving and 11 rovings to establish the common base number of fibers, the positive non-zero integer of the intermediate layers 32a-e is 1, and the positive non-zero integers of each of the fibrous core 138 and the outermost fiber layer 32f is 3. Thus, the positive non-zero integers of at least two of the fiber layers 32 differ by at least 2, and the positive non-zero integer multiplier factor is 3.

A method of fabricating the composite coil spring 20 includes forming the coil body 22 as described above. For example, for a given fiber layer 32 or the optional fibrous core 138, an appropriate number of spools or fiber rovings corresponding to the selected positive non-zero integer for that fiber layer 32 or the fibrous core 138 provide the fibers 34 through a guide device and a reservoir of the polymer resin material to impregnate the fibers 34. The impregnated fibers are then wound around the core 38 using winding equipment. This process is repeated for each of the fiber layers 32 until a desired number of fiber layers 32 are wound.

The resulting resin-impregnated fiber structure is then removed from the winding equipment. The structure is arranged into a coil groove of a mandrel. The coil groove corresponds to the desired end shape of the composite coil spring 20. The mandrel and structure are then heated in a furnace to cure the resin and thereby form the permanent shape of the composite coil spring 20. The heating temperature and time depend upon the type of polymer material selected and, given this description, one of ordinary skill in the art will be able to determine a suitable heating temperature and time to meet their particular needs. The mandrel is then removed by mechanical or other means, leaving the finished or near finished composite coil spring 20.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite coil spring comprising:
a coil body including a core and a plurality of fiber layers impregnated with a polymer material, the fiber layers being wound around the core at different radial distances from a coiled axis,
each of the fiber layers extending around the coiled axis at an oblique fiber angle to the coiled axis,
each of the fiber layers including a number of fibers that is a product of a common base number of fibers multiplied by a positive non-zero integer from a set of positive non-zero integers from 1 to 20,
the positive non-zero integer of at least one of the fiber layers is different from the positive non-zero integer of at least one other of the fiber layers,
wherein at least one of the fiber layers is glass fibers and another of the fiber layers is carbon fibers,
wherein each of an innermost fiber layer and an outmost fiber layer of the fiber layers is independently selected from glass fibers and carbon fibers, and
wherein at least one of the fiber layers is metallic fibers or ceramic fibers.

2. The composite coil spring as recited in claim 1, wherein the oblique angle is +/−20-54°.

3. The composite coil spring as recited in claim 1, wherein the innermost fiber layer and the outermost fiber layer have equal positive non-zero integers.

4. The composite coil spring as recited in claim 1, wherein the innermost fiber layer and the outermost fiber layer have non-equal positive non-zero integers.

5. The composite coil spring as recited in claim 1, wherein the core is a fibrous core.

6. The composite coil spring as recited in claim 1, wherein the positive non-zero integer of the one of the fiber layers that is different from the positive non-zero integer of the other of the fiber layers is different by more than 2.

7. The composite coil spring as recited in claim 6, wherein the fiber layer that has the positive non-zero integer that is different from the positive non-zero integer of the other of the fiber layers by more than 2 is glass fibers, and the other of the fiber layers is carbon fibers.

8. The composite coil spring as recited in claim 7, wherein the oblique fiber angle of each of the plurality of fiber layers is also oblique to at least one directly neighboring one of the plurality of fiber layers.

9. A composite coil spring comprising:
a coil body including a core and a plurality of fiber layers impregnated with a polymer material, the fiber layers being wound around the core at different radial distances from a coiled axis,
each of the fiber layers extending around the coiled axis at an oblique fiber angle to the coiled axis,
each of the fiber layers including a number of fibers that is a product of a common base number of fibers multiplied by a positive non-zero integer from a set of positive non-zero integers from 1 to 20,
the positive non-zero integer of at least one of the fiber layers is different from the positive non-zero integer of at least one other of the fiber layers,
wherein at least one of the fiber layers is glass fibers and another of the fiber layers is carbon fibers,
wherein each of an innermost fiber layer and an outmost fiber layer of the fiber layers is independently selected from glass fibers and carbon fibers,
wherein the positive non-zero integer of the one of the fiber layers that is different from the positive non-zero integer of the other of the fiber layers is different by more than 2, wherein the fiber layer that has the positive non-zero integer that is different from the positive non-zero integer of the other of the fiber layers by more than 2 is glass fibers, and the other of the fiber layers is carbon fibers, wherein the oblique fiber angle of each of the plurality of fiber layers is also oblique to at least one directly neighboring one of the plurality of fiber layers, and wherein each of the fiber layers contains from 4 to 60 fiber rovings.

10. The composite coil spring as recited in claim 9, wherein each of the fiber rovings has either 2000 fibers or 4000 fibers.

11. The composite coil spring as recited in claim 8, wherein the innermost fiber layer and the outermost fiber layer have non-equal positive non-zero integers.

12. The composite coil spring as recited in claim 1, wherein the polymer material includes at least one of epoxy or polyester.

13. The composite coil spring as recited in claim 1, wherein at least one of the fiber layers is aramid fibers.

14. The composite coil spring as recited in claim 1, wherein the core is a solid core.

15. A composite coil spring comprising:
a coil body including a core and a plurality of fiber layers impregnated with a polymer material, the fiber layers being wound around the core at different radial distances from a coiled axis,
each of the fiber layers extending around the coiled axis at an oblique fiber angle to the coiled axis,
each of the fiber layers including a number of fibers that is a product of a common base number of fibers multiplied by a positive non-zero integer from a set of positive non-zero integers from 1 to 20,
the positive non-zero integer of at least one of the fiber layers is different from the positive non-zero integer of at least one other of the fiber layers,
wherein at least one of the fiber layers is glass fibers and another of the fiber layers is carbon fibers, and
wherein each of an innermost fiber layer and an outmost fiber layer of the fiber layers contains from 4 to 60 fiber rovings.

16. The composite coil spring as recited in claim 15, wherein the oblique fiber angle is +/−20-54°.

17. The composite coil spring as recited in claim 16, wherein the fiber layer that has the positive non-zero integer that is different from the positive non-zero integer of the other of the fiber layers by more than 2 is glass fibers, and the other of the fiber layers is carbon fibers.

18. The composite coil spring as recited in claim 15, wherein each of the fiber rovings has either 2000 fibers or 4000 fibers.

19. The composite coil spring as recited in claim 15, wherein the innermost fiber layer and the outermost fiber layer have non-equal positive non-zero integers.

* * * * *